(12) United States Patent
Haney et al.

(10) Patent No.: US 7,996,696 B1
(45) Date of Patent: Aug. 9, 2011

(54) UPDATING KERNEL AFFINITY FOR APPLICATIONS EXECUTING IN A MULTIPROCESSOR SYSTEM

(75) Inventors: David Wayne Haney, Kansas City, MO (US); Christopher Joseph Mateski, Overland Park, KS (US); Andrew Lee Davey, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1053 days.

(21) Appl. No.: 11/747,995

(22) Filed: May 14, 2007

(51) Int. Cl.
G06F 1/00 (2006.01)
G06F 1/32 (2006.01)

(52) U.S. Cl. ........ 713/324; 713/300; 713/310; 713/320; 718/102; 718/104

(58) Field of Classification Search .................. 713/300, 713/320, 324, 310; 718/102, 104
See application file for complete search history.

(56) References Cited

U.S. PATENT DOCUMENTS

| | | | |
|---|---|---|---|
| 7,409,570 B2 * | 8/2008 | Suzuoki | 713/324 |
| 2005/0228967 A1 * | 10/2005 | Hirairi | 712/1 |
| 2007/0260417 A1 * | 11/2007 | Starmer et al. | 702/136 |
| 2008/0046895 A1 * | 2/2008 | Dillenberger et al. | 718/105 |

OTHER PUBLICATIONS

Vasanth Venkatachalam et al, "Power Reduction Techniques for Microprocessor Systems," ACM Computing Surveys, vol. 37, No. 3, Sep. 2005, pp. 195-237, Univ. of Calif. at Irvine.
Frank Bellosa, "The Benefits of Event-Driven Energy Accounting in Power-Sensitive Systems," 2000, Dept. of Computer Science (Operating Systems), pp. 37-42, University of Erlangen, Martensstr. 1, 91058, Erlangen, Germany, bellosa@acm.org.
Chung-Hsing Hsu et al., "A Power-Aware Run-Time System for High-Performance Computing," 9 pages, Proceedings of the 2005 ACM/IEEE SC/05 Conference, Los Alamos National Laboratory, Los Alamos, NM.
Yiyu Chen et al., "Managing Server Energy and Operational Costs in Hosting Centers," Jun. 6-10, 2005, pp. 303-314, ACM Sigmetrics '05, Banff, Alberta, Canada.

* cited by examiner

Primary Examiner — Thomas Lee
Assistant Examiner — Michael J Brown

(57) ABSTRACT

A multiprocessor system dynamically updates CPU affinities for processes executing on processors of the multiprocessor system based on an external signal. The external signal is generated by a monitor device. The external signal identifies the processors and the processes that require updating. In response to the external signal, the multiprocessor system redistributes the processes identified in the external signal and powers on or off one or more processors based on a processor threshold associated with the multiprocessor system.

19 Claims, 4 Drawing Sheets

UPDATING KERNEL AFFINITY FOR APPLICATIONS EXECUTING IN A MULTIPROCESSOR SYSTEM

INTRODUCTION

Conventionally, computer systems that utilize multiple processors to complete tasks and measurements tend to consume large quantities of power and generate massive quantities of heat. The conventional computer systems are configured with cooling systems that attempt to ensure that all components of the computer system are within an optimal temperature threshold. When the computer system is executing resource-intensive tasks or measurements, the quantity of power and heat generated by the computer system increases. Generally, this increase in power consumption by components of the computer system is followed by an increase in power consumption by the cooling systems, which attempt to maintain the optimal temperature threshold. Unfortunately, the increases in power consumption may increase operational costs for the computer system and may negatively impact the processing performance of the computer system.

Some conventional computer systems address the increased power consumption by installing dynamic voltage and frequency scaling components and by requiring developers to implement power-aware applications. The conventional computer systems execute the power-aware applications and dynamic voltage and frequency scaling components. The dynamic voltage and frequency scaling components enable the power-aware applications running on the computer systems to receive processor utilization metrics, i.e., processor frequency, processor voltage, etc. The conventional computer system may utilize the processor utilization metrics to trigger the dynamic voltage and frequency scaling components to reduce processor frequency or voltage supplied to the processor, when a processor is not executing resource-intensive tasks. Thus, power consumption may be reduced, when the processor is not executing resource-intensive tasks. However, there still exists a need for, among other things, computer systems that address processor performance and power consumption in multiprocessor systems that execute both legacy applications and power-aware applications.

SUMMARY

The present invention is defined by the claims below. Embodiments of the present invention solve at least the above problems by providing multiprocessor systems, computer readable media, and methods for, among other things, managing the central processing unit (CPU) affinity of threads and/or processes in multiprocessor systems and dynamically provisioning processors in the multiprocessor system with load based on external signals. The present invention has several practical applications in the useful arts including, among other things, reducing power consumption in a multiprocessor system, complying with processor limitations imposed by license agreements, and testing performance by simulating load in the multiprocessor system.

In a first aspect, a set of computer-useable instructions provide a method to manage CPU affinity in a multiprocessor system. The multiprocessor system may receive an external signal that specifies changes in CPU affinity for one or more processes associated with each processor in the multiprocessor system. In response to the external signal, a list identifying each processor in the multiprocessor system, each process executed by each processor, and a current CPU affinity for each process is generated. The multiprocessor system determines whether the change in CPU affinity specified by the external signal requires changes to the current processor affinity of any processes currently running. When the change in CPU affinity does require changes to the current processor affinity, the processes are redistributed to the processors as identified in the external signal. When the change in CPU affinity is below the specified threshold, each processes is redistributed to a main processor of the multiprocessor system. In turn, the list identifying the processes associated with each processor of the multiprocessor system is traversed to update the CPU affinity and power consumption for a subset of the processors in the multiprocessor system.

In a second aspect, the multiprocessor system includes servers configured to execute processes on more than one processor. Each server is associated with a CPU affinity component that is configured to update the processes that execute on the processors based on an external signal specifying a change in the CPU affinity. The multiprocessor system is communicatively connected to external monitors configured to generate the external signal and transmit the external signals to one or more servers in the multiprocessor system.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
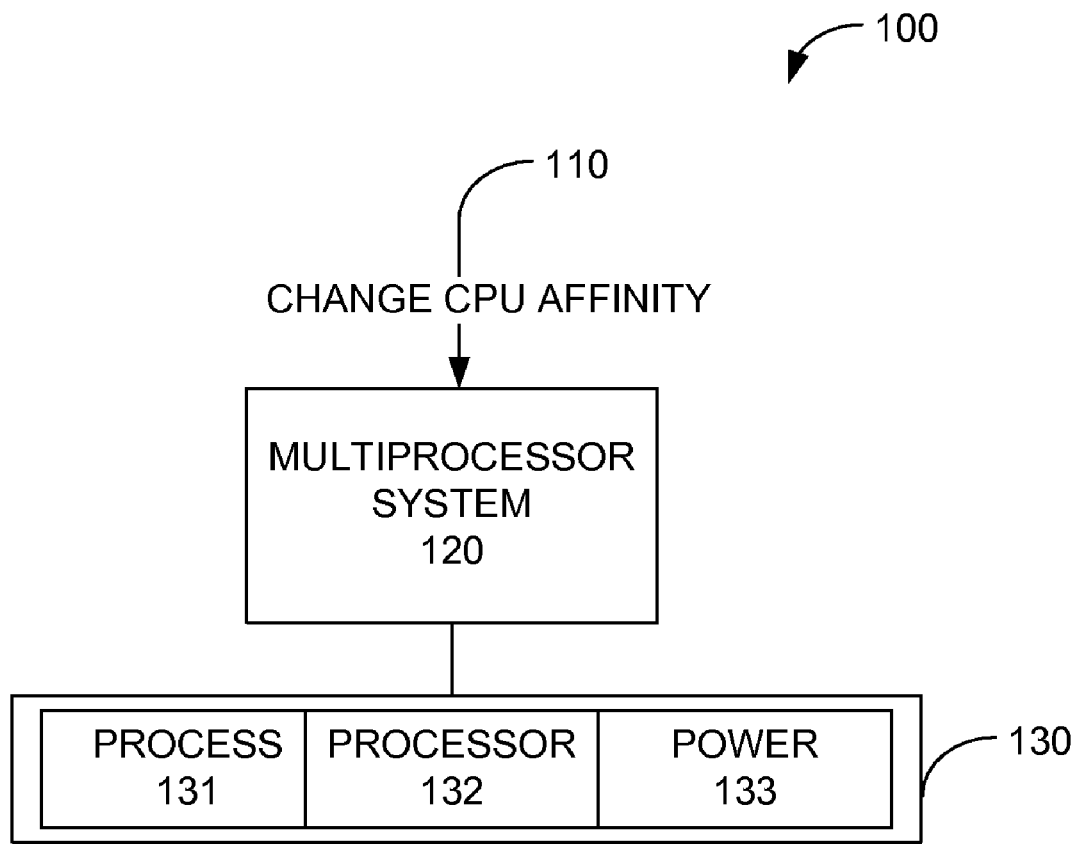
FIG. 1 is a block diagram that illustrates an exemplary multiprocessor system, according to embodiments of the present invention.

Embodiments of the present invention provide multiprocessor systems, computer-readable media, and methods for responding to external signals that cause one or more processes executing in the multiprocessor system to change processors. The external signals are configured to alter CPU affinities for one or more processes executing in the multiprocessor system. The change in CPU affinity for each process may require each process to execute on one or more of the processors included in the multiprocessor system. When the change in CPU affinity for each process in the multiprocessor system results in one or more processors that are not executing at least one process, the multiprocessor system may remove power from the one or more processors that are not executing at least one process. Similarly, a change in CPU affinity that migrates one or more processes to a processor that is powered off may require the multiprocessor system to power on one or more processors that are offline. Thus, the multiprocessor system may shutdown or startup processors based on external signals received from, among other things, licensing servers, heating ventilation and air conditioning (HVAC) management servers, or testing clients.

In some embodiments, a main processor in the multiprocessor system manages updates to CPU affiity for each process exuecting the multiprocessor system. The main processor is the processor configured to execute the operating system for the multiprocessor system. The opertaing system exuecuting on the main processor may provide CPU affinity functions that may be utilized to retrieve or update the CPU affinity. After the multiprocessor system recieves the external signal, the CPU affinity functions are utilized to gather a list of all processes on the multiprocess system. For each process, the list identifies, among other things, process name, processors that are authorized to the execute the process, processors that are currently executing the process, and power consumption for each processor. The main processor processes the external signal to identify changes in CPU affinity and to update the list to reflect the changes specified in the external signal. In an embodiment, changes to the CPU affinity for processes executing in the multiprocessor system may bind all processes to a specified subset of processors available on the multiprocess system. The specified subset of processors is selected to be less than all of the available processors in the multiprocessor system. The main processor updates the CPU affinity of the processes and prevents each process from executing on any processor that is not included in the subset of processors. In an alternate embodiment, the external signal may specify a change in CPU affinity that triggers the main processor to update the CPU affinity for each process in the multiprocesor system. In turn, each process may execute on any processor available in the multiprocessor system based on the change in CPU affinity.

As utilized herein, the term "CPU affinity" represents the tendency for a process to run on an identified processor. Computer-readable media include both volatile and nonvolatile media, removable and nonremovable media, and contemplates media readable by a database, a switch, and various other network devices. Switches, routers, and related components are conventional in nature, as are means of communicating with the same. By way of example, and not limitation, computer-readable media comprise computer-storage media and communication media.

A multiprocessor system receives an external signal that specifies, among other things, a change in CPU affinity. The multiprocessor system processes the external signal and updates the CPU affinity for a list of processes. In certain embodiments, based on the change in CPU affinity, one or more processors in the multiprocessor system are shutdown or powered on.

FIG. 1 is a block diagram that illustrates an exemplary operating environment 100, according to an embodiment of the present invention. The operating environment 100 may include an external signal 110, a multiprocessor system 120, and a list 130.

The external signal 110 is configured to identify a change in CPU affinity. The external signal 110 may be generated in response to notifications received from licensing servers, HVAC management servers, or testing clients. In some embodiments, the external signal 110 is a remote procedure call that triggers the multiprocessor system to execute one or more functions. The external signal 110 may represent the changes in CPU affinity by identifying which processes must move to different processors in the multiprocessor system 120. In some embodiments, processor flags for each processor in the multiprocessor system 120 may be utilized to identify a change in the CPU affinity for processes that are executing in the multiprocessor system 120. The external signal 110 is transmitted to the multiprocessor system 120.

The multiprocessor system 120 is a high speed computing system that includes two or more processors that operate in parallel to execute a collection of processes. The multiprocessor system 120 is configured to manage a CPU affinity for each executing process. The multiprocessor system 120 receives the external signal 110 and checks the external signal 110 for a change in CPU affinity. In some embodiments, the CPU affinity is identified by a group of processor flags that may be set for each individual process in the multiprocessor system 120. The multiprocessor system 120 generates a list 130 that includes processes executing on each processor and a current CPU affinity for each process. In one embodiment, a set processor flag configured by the multiprocessor system 120 may represent a process that always execute on a processor associated with the flag. In an alternate embodiment, a set processor flag configured by the multiprocessor system 120 may represent a process that never executes on a processor associated with the flag. The multiprocessor system 120 may update processor flags to reflect changes in CPU affinity specified in the external signal 110.

The list 130 is generated by the multiprocessor system 120 to identify properties for each process and processor in the multiprocessor system. The list 130 may include, among other things, a process identifier 131, a current CPU affinity 132 for the process, and the power consumption 133 for each processor that may execute the process. After the multiprocessor system 120 receives the updates to the CPU affinity for each processor, the list 130 is updated to reflect the changes in CPU affinity specified by the external signal 110. In some embodiments, the list 130 is provided to a user of the multiprocessor system 120.

In an embodiment, the multiprocessor system may be a collection of computers and servers that are connected over a communication network. Each server, which connects to the communication network is configured to run more than one processor. Further, the communication network connects to an external monitor that generates the external signal based on notifications received from one or more computing devices that monitor the multiprocessor system's environmental and computing conditions, i.e. temperature, number of licensed processors, energy usage, etc.

Figure 2:
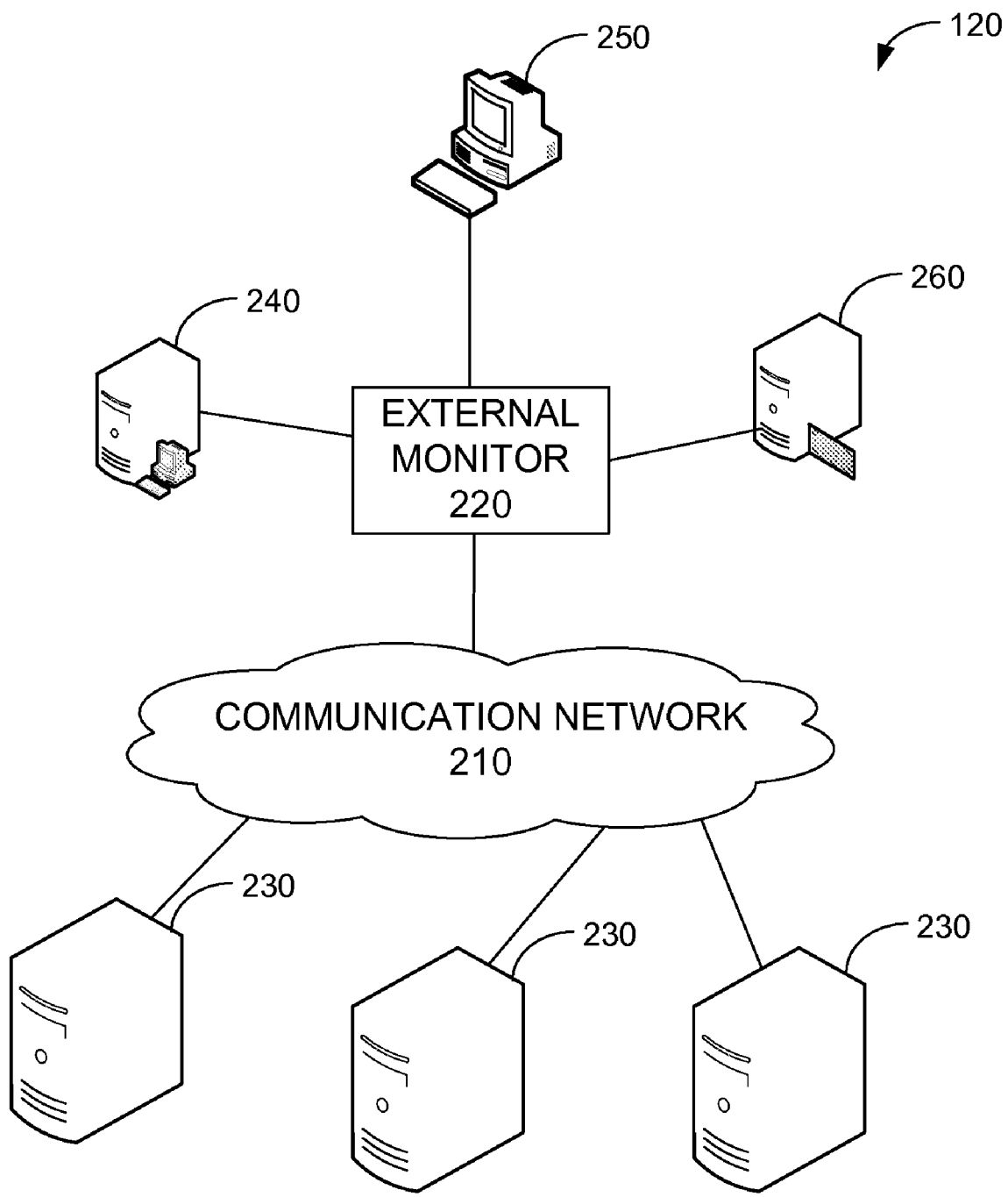
FIG. 2 is a network diagram that illustrates further details of the exemplary multiprocessor system of FIG. 1, according to embodiments of the present invention.

FIG. 2 is a network diagram that illustrates further details of the exemplary multiprocessor system 120 of FIG. 1, according to an embodiment of the present invention. The multiprocessor system 120 may include a communication network 210, an external monitor 220, servers 230, a HVAC management server 240, a testing client 250, and a licensing server 260.

The communication network 210 may be a wired or wireless network. The communication network 210 connects the external monitor 220 to the servers 230. The communication network 210 transmits an external signal generated by the external monitor 220 to one or more servers 230. In some embodiments, the communication network 210 may utilize a multiprocessor bus architecture to connect the external monitor 220 and servers 230.

The external monitor 220 receives notifications from the HVAC management server 240, the testing client 250, and the licensing server 260. In response to the notifications, the external monitor 220 is configured to generate an external signal that changes CPU affinity, shutsdown one or more processors, or powers on one or more processors. The external signal is generated in response to notifications that requires the multiprocessor system 120 to conserve power, notifications that require the multiprocessor system 120 to comply with licensing arrangements, or notifications that require the multiprocessor system 120 to reduce heat emission because too much heat is being generated by the multiprocessor system 120. In some embodiments, the notification can be generated from any device that generates a notification in response to environmental and computing conditions, where the device is authorized and configured to connect and communicate with the external monitor 220. Based on the notifications, the external monitor 220 may configure the external signal to alter CPU affinity for one or more processes executing on the servers 230. In one embodiment, the external monitor 220 configures the external signal with an identifier for each process that is impacted by the change in CPU affinity. For each process identified in the external signal, processor flags that represent each processor in the servers 230 are configured in a set position or an unset position. When the processor flag is in the set position, the process is allowed to execute on the processor associated with the processor flag. When the processor flag is in the unset position, the process is not allowed to execute on the processor associated with the processor flag. Once the external signal is generated and configured with the appropriate data, the external monitor 220 transmits the external signal over the communication network 210.

The servers 230 receive the external signal and update the CPU affinity for the processors running on each server 230 identified by the external signal. The servers 230 may execute two or more processors in parallel. In one embodiment, each server 230 identified by the external signal includes a main processor that runs the operating system and manages updates to CPU affinity for the processes and processors within the server 230. Thus, each server 230 manages its own changes to CPU affinity. In another embodiment, a single server 230 may be designated as a controller and all CPU affinity updates for each server 230, identified by the external signal, is performed by the server that is designated as the controller.

In some embodiments of the present invention, the notifications that trigger the external signal are generated by the HVAC management server 240, the testing client 250, or the licensing server 260. The HVAC management server 240 measures climate conditions for the multiprocessor system 120 and generates a notification when the temperature, humidity, or other environmental condition violates thresholds associated with each condition monitored by the HVAC management server 240. The testing client 250 enables an administrator to simulate load in the multiprocessor system 120. For instance, the administrator may utilize the testing client 250 to simulate a two CPU system or a one CPU system. The testing client 250 generates the notifications based on requests received from the administrator. In some embodiments, the testing client 250 may generate data that provides artificial load to the servers 230 to test strengths and weaknesses of the servers 230. When generating the artificial load, the testing client 250 may dynamically remove or add processors that are executing in the servers 230 by generating notifications to update the CPU affinity. The licensing server 260 monitors compliance with licensing agreements. The licensing server 260 may generate notifications to update CPU affinity when the number of processors executing the processes in the servers 230 are above the number of processors authorized in the licensing agreements. Accordingly, in response to the notifications from, among other things, the HVAC management server 240, the testing client 250, or the licensing server 260, the external monitor generates an external signal that is configured to update CPU affinity for processes executing on the servers 230.

In some embodiments, each server in the multiprocessor system is configured with multiple processors. Each server may include a CPU affinity component that receives the external signal from the external monitor. The CPU affinity component processes the external signal and redistributes processes executing on the processors based on the changes specified in the external signal. Moreover, the CPU affinity component may trigger the server to power on or off processors in response to the external signal.

Figure 3:
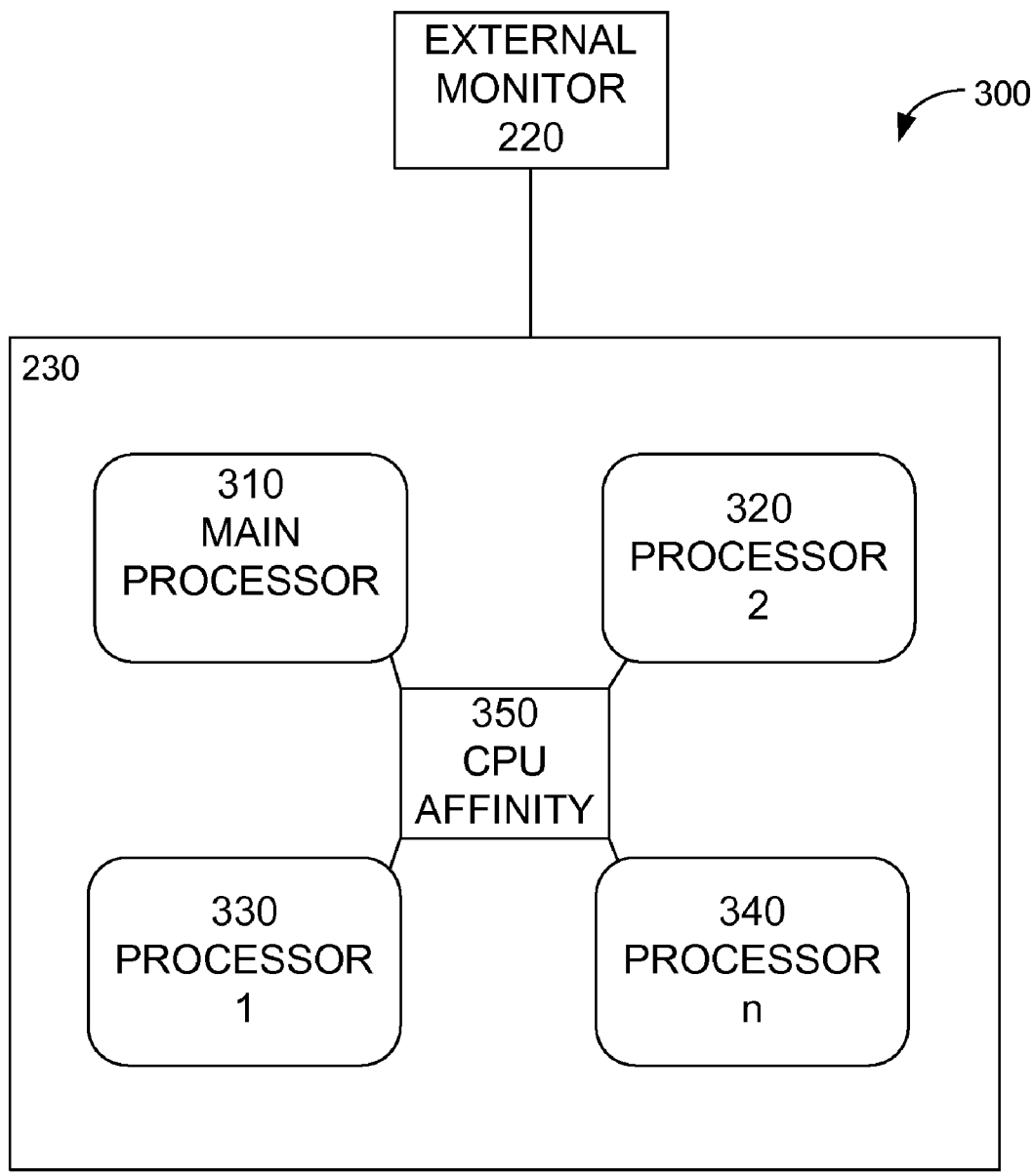
FIG. 3 is a block diagram that further illustrates exemplary processors included in the server of FIG. 2, according to embodiments of the present invention.

FIG. 3 is a block diagram that further illustrates exemplary processors 310-340 included in the servers 230 of FIG. 2, according to embodiments of the present invention. Each server 230 may includes a main processor 310, other processors 320-340, and a CPU affinity component 350.

The main processor 310 executes the operating system for the server 230. The main processor 310 is configured to execute the CPU affinity component 350. The main processor 310 may execute processes that are allowed to execute on the main processor. The main processor 310 receives external signals from the external monitor 220 and utilizes the CPU affinity component 350 to process the external signals and to update the CPU affinity for each process executing in the server 230. In one embodiment, the main processor 310 always execute the CPU affinity component and can not be power off.

The other processors 320-340 execute the other processes that are running on the server 230. Typically, each process executing on the processors 320-340 is authorized to run on the processors 320-340. Each processor 320-340 is configured to keep a record for each process it executes. Also, the processors 320-340 monitor a level of power consumed when executing the processes. The main processor 310 may periodically retrieve, from each processor 320-340, a process list and the power consumption associated with each processor 320-340.

The CPU affinity component 350 executing on the main processor 310 receives the process list and power consumption for each processor 320-340 and stores the data in a list that identifies, among other things, the processes executing on each processor 310-340, the power consumption for each processor 310-340, and the current affinity for each process. The CPU affinity component 350 processes the external signal to identify the update in CPU affinity specified in the external signal. In turn, the CPU affinity component 350 notifies the server 230 of the change in CPU affinity for each process identified in the external signal. The server 230 receives the change and tags each process with an appropriate processor flag that identifies which processors are authorized to execute the process. Also, the CPU affinity component 350 triggers the processors 310-340 to redistribute processes based on the change in CPU affinity specified by the external signal. For instance, the external signal may trigger a four processor server 230 to power off two processors 320 and 330. In response to this external signal, the CPU affinity component 350 may trigger the two processors 320 and 330 to redistribute all the processes currently executing on the processors 320 and 330 such that the main processor 310 and one of the three other processors 340 continue executing all processes for the server 230 and proportionately load processors 310 and 340 with the processes from 320 and 330 based on resource availability at processors 310 and 340.

In an embodiment of the present invention, the CPU affinity component is configured to manage the CPU affinity updates for a multiprocessor system. The CPU affinity component executes instructions that process the external signal and updates the CPU affinity for each process in the multiprocessor system. Based on the external signal, all processes in the multiprocessor system may only run on a subset of processors available in the multiple processor system. Thus, the CPU affinity component may exclude the processes from running on a certain set of processors based on the changes in CPU affinity specified in the external signal.

Figure 4:
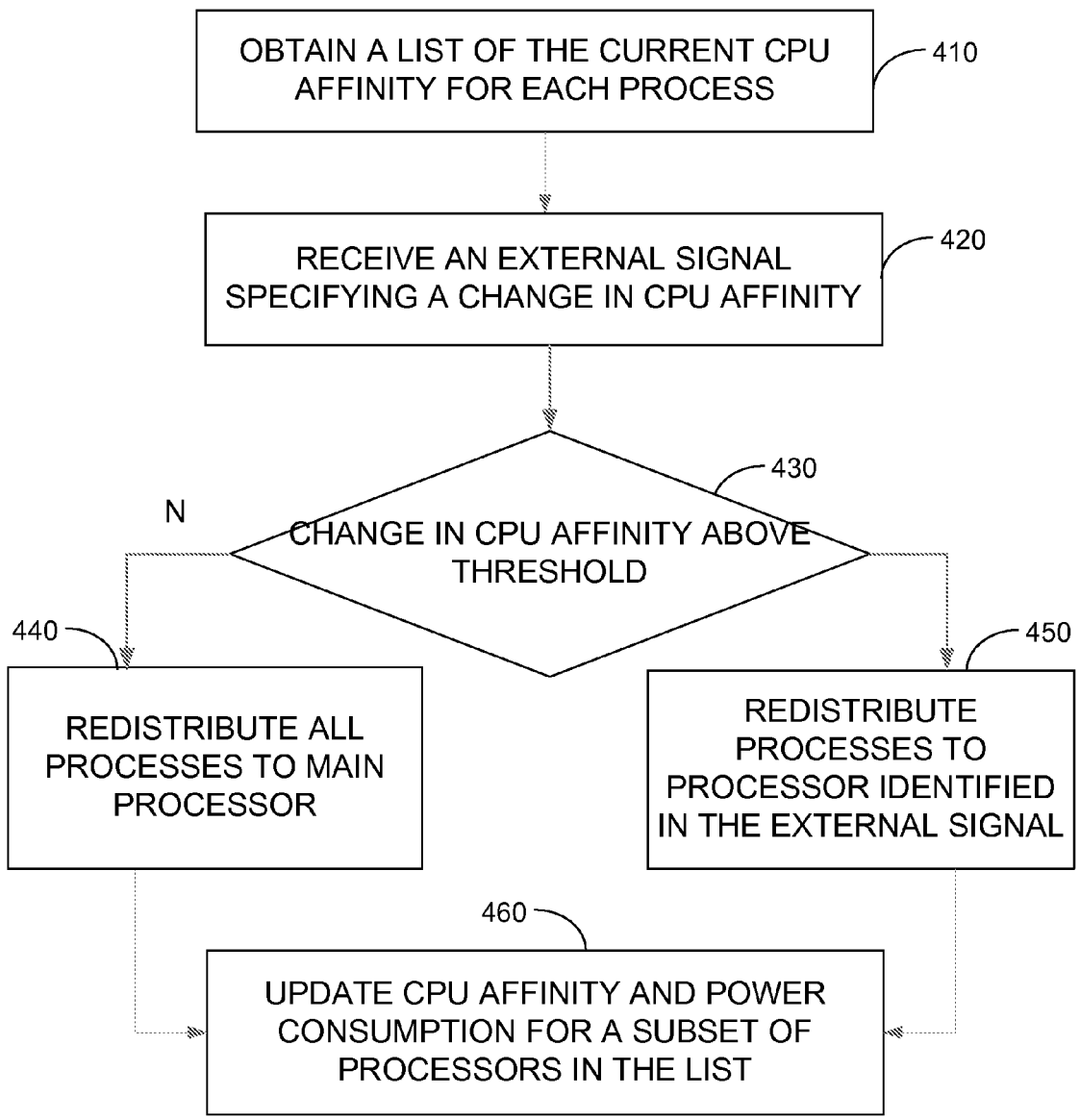
FIG. 4 is a logic diagram that illustrates a method to manage CPU affinity in a multiprocessor system, according to embodiments of the present invention.

FIG. 4 is a logic diagram that illustrates a method to manage CPU affinity in a multiprocessor system, according to an embodiment of the present invention.

In operation 410, a CPU affinity component executing in the multiprocessor system obtains a list of the current CPU affinity for each process. In operation 420, when the CPU affinity component receives an external signal that specifies a change in CPU affinity, the change is checked by the CPU affinity component to determine whether the changes is above a specified threshold, in operation 430. When the change is below the specified threshold, each process is redistributed to the main processor, in operation 440. In some embodiments, the change in CPU affinity is implemented so that the main processor of the multiprocessor system is always executing at least one process. When the change is above the specified threshold, i.e., the processes may operate on more than one processor, each process is redistributed to the processors identified in the external signal, in operation 450. In turn, the CPU affinity component updates current CPU affinity and power consumption for each processor that was not disabled by the external signal, in operation 460.

In summary, a CPU affinity component running on a server may force a given number of processors offline or online in response to an external signal. The external signal is generated in response to events, such as, for example, emergency power, processor overloading, processor overheating, license violations, or adminsitrator load tests. The CPU affinity component is configured to update the CPU affintiy of the multiple processor system without having to load the processors on a different multiprocessor systems, without requiring a technicin to physically remove or add processor to the multiprocessor system, or without rebooting the multiprocessor system. The CPU affinity component implements external signals that identify, among other things, one or more processor that should continue operating and processes that should exectue on the one or more operational processors in the multiprocessor system.

It will be understood that certain features and subcombinations are of utility and may be employed without reference to other features and subcombinations and are contemplated within the scope of the claims. Not all operations listed in the various figures need be carried out in the specific order described.

The invention claimed is:

1. One or more non-transitory computer-storage media having computer-useable instructions that perform a method for managing CPU affinity in a multiprocessor system having a main processor that executes an operating system, the method comprising:
  receiving an external signal generated by an external monitor, wherein the external signal specifies changes in CPU affinity for one or more processes associated with one or more processors in the multiprocessor system;
  obtaining a list identifying processors in the multiprocessor system, processes executed by the processors of the multiprocessor system, and a current CPU affinity for each process;
  determining whether the change in CPU affinity specified by the external signal is above a specified threshold:
    (1) if the change in CPU affinity is above the specified threshold, redistributing the processes to the processors identified in the external signal, and
    (2) if the change in CPU affinity is below the specified threshold, redistributing all processes to the main processor; and
  traversing the list identifying the processes associated with the processors of the multiprocessor system to update the CPU affinity and power consumption for a subset of the processors.

2. The media of claim 1, further comprising powering processors in the multiprocessor system that are associated with any of the processes, based on the change in CPU affinity specified by the external signal.

3. The media of claim 1, further comprising powering off processors in the multiprocessor system that are not associated with any of the processes, based on the change in CPU affinity specified by the external signal.

4. The media of claim 1, wherein the external signal is generated in response to testing signals received from a client device.

5. The media of claim 1, wherein the external signal is generated in response to license compliance notifications received from a licensing server.

6. The media of claim 1, wherein the external signal is generated in response to an emergency power notification triggered by a drain in power.

7. The media of claim 1, wherein the change in CPU affinity identifies the number of processors that the processes can utilize.

8. The media of claim 7, wherein the threshold is one processor.

9. A computer system having a processor and memory that are configured to perform a method for managing CPU affinity in a multiprocessor system, the method comprising:
  receiving an external signal generated by an external monitor, wherein the external signal specifies changes in CPU affinity for one or more processes associated with each processor in the multiprocessor system;
  obtaining a list identifying processors on the multiprocessor system, processes executed by the processors of the multiprocessor system, and a current CPU affinity for each process;
  determining whether the change in CPU affinity specified by the external signal is above a specified threshold:
    (1) if the change in CPU affinity is above the specified threshold, redistributing the processes to the processors identified in the external signal, and
    (2) if the change in CPU affinity is below the specified threshold, redistributing all processes to the main processor; and
  traversing the list identifying the processes associated with the processors of the multiprocessor system to update the CPU affinity and power consumption for one or more processors.

10. The computer system of claim 9, further comprising powering on processors in the multiprocessor system that are associated with any of the processes, based on the change in CPU affinity specified by the external signal.

11. The computer system of claim 9, further comprising powering off processors in the multiprocessor system that are not associated with any of the processes, based on the change in CPU affinity specified by the external signal.

12. The computer system of claim 9, wherein the change in CPU affinity identifies the number of processors that the processes can utilize.

13. The computer system of claim 12, wherein the threshold is one processor.

14. A multiprocessor system having servers that dynamically manage CPU affinity, the multiprocessor system comprising:
  servers configured to execute processes on more than one processor;

a CPU-affinity component executing on a main processor of each server, wherein the CPU affinity component is configured to store a list identifying power consumption and processes executed by each processor in each corresponding server and update processes that execute on the processors within each corresponding server based on an external signal that specifies a change in the CPU affinity, wherein the processes are redistributed to the processors identified in the external signal for a change in the CPU affinity above a specified threshold, and the processes are redistributed to the main processor for a change in the CPU affinity below the specified threshold; and external monitors configured to generate the external signal and transmit the external signal to the servers.

15. The multiprocessor system of claim 14, further comprising a communication network that connects the servers to the external monitors.

16. The multiprocessor system of claim 14, wherein the CPU affinity component is configured to execute on a processor that executes that operating system for each server.

17. The multiprocessor system of claim 14, wherein the external monitor observes a power management system to determine which processors to power off or power on.

18. The multiprocessor system of claim 14, wherein the external monitor observes a licensing server to determine which processors to power off or power on.

19. The multiprocessor system of claim 14, wherein the external monitor observes a testing client to determine which processors to power off or power on.

* * * * *